Oct. 3, 1933.   E. E. HARPER   1,929,243
LIQUID FEEDING AND MEASURING APPARATUS
Filed March 7, 1932
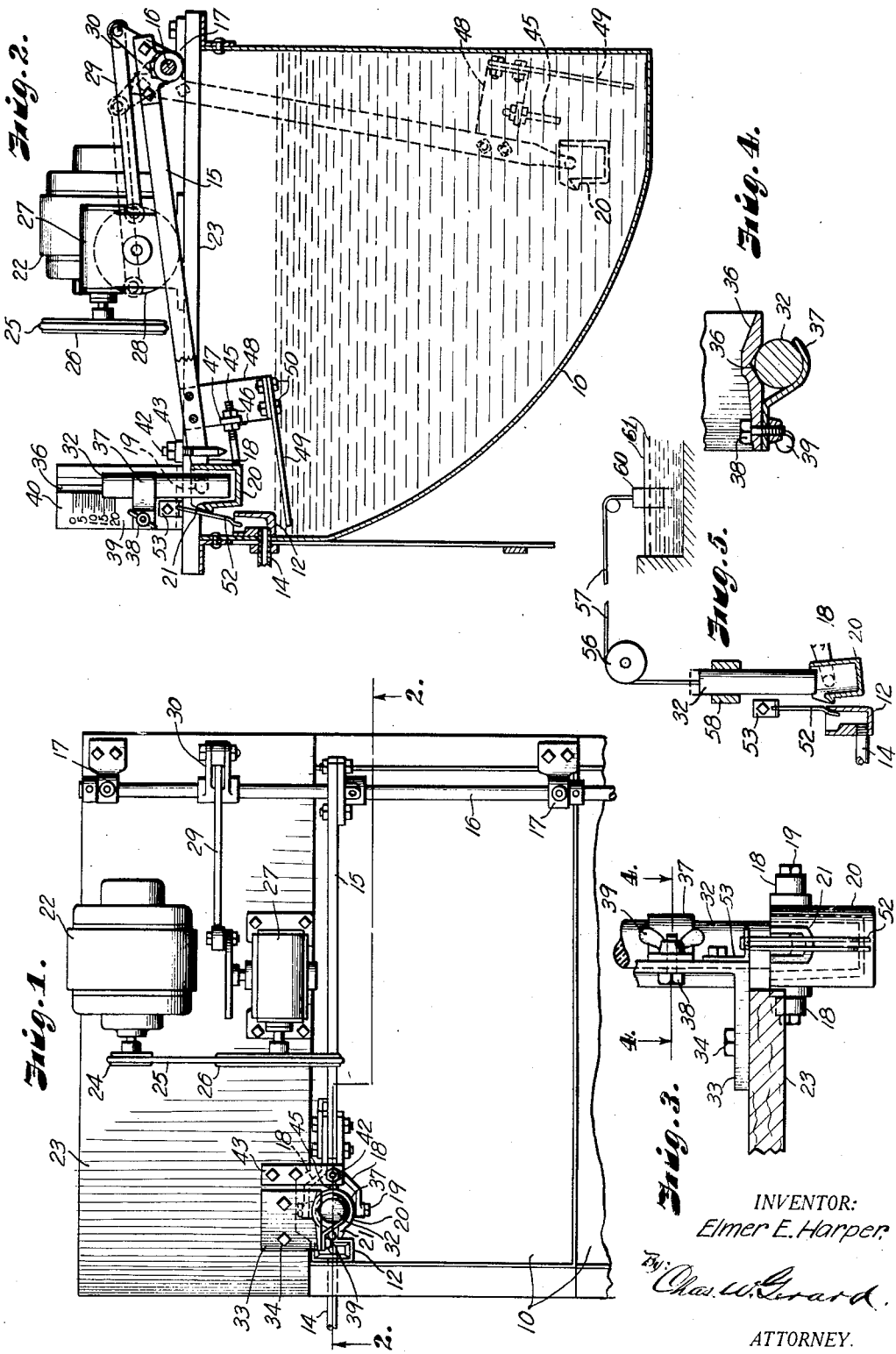
INVENTOR:
Elmer E. Harper.
By Chas. W. Gerard
ATTORNEY.

Patented Oct. 3, 1933

1,929,243

UNITED STATES PATENT OFFICE 1,929,243

LIQUID FEEDING AND MEASURING APPARATUS

Elmer E. Harper, Kansas City, Mo.

Application March 7, 1932. Serial No. 597,385

5 Claims. (Cl. 221—97)

The present invention relates to liquid handling apparatus, designed for the feeding or dispensing of liquids, such as solutions or the like, in measured quantities and at various rates according to requirements, and one of the principal objects in view is to devise an efficient apparatus in which the measuring function takes place on the positive displacement principle for measuring a definite given volume of the liquid at whatever rate may be necessary for any given liquid feeding operation.

In its primary essentials, the improved apparatus comprises suitable means for segregating a portion of the liquid which is to be fed at a given rate, together with liquid displacing means, of a character adapted for convenient adjustment and control, and operative to displace a given volume of liquid from said segregated quantity, into the channel into which the liquid so measured and fed is to be received.

For the carrying out of this feeding and measuring function, I have devised an apparatus comprising a suitable liquid transferring receptacle in combination with a liquid displacing member, arranged for relative movement whereby the liquid displacing member operates, according to its adjustment, to discharge a given volume of the liquid from the receptacle.

As one practical embodiment of the improved construction, the apparatus comprises a suitable container for the liquid, for example, a tank in which is mounted a moving receptacle, such as a cup, adapted to dip a portion of the liquid and convey it to the discharge point where a plunger of a given size enters the cup and displaces a measured volume of the liquid from the cup into the discharge passage.

It is also sought to devise an apparatus of the character described which will be in all respects fully adapted for every adjustment required for the control and variation of the liquid feeding and measuring action, as by being operated intermittently or at a rate approaching a practically continuous feeding action, or under some circumstances be varied in proportion to the function or demands of some other device or equipment in connection with which the present apparatus may be installed.

A further object of the invention is to provide apparatus of this character which may be comprised of a plurality of liquid feeding units, adapted to be readily assembled in operative relation to a common actuating mechanism, which may further include a suitable agitating device in connection with each unit, for maintaining a continuous agitation of the liquid being fed and measured.

With the foregoing general objects in view, as well as various minor features of improvement as will be hereinafter pointed out in more detail, the invention will now be described by reference to the accompanying drawing illustrating a form of apparatus which I have devised for embodying the several proposed improvements, after which those features and combinations deemed to be novel will be set forth and claimed.

In the drawing—

Figure 1 is a plan view, illustrating a liquid feeding and measuring apparatus constructed in accordance with the present invention;

Figure 2 is a vertical sectional view, representing a section taken on the line 2—2 of Figure 1;

Figure 3 is a fragmentary detail view of the displacement plunger and cup elements, on an enlarged scale.

Figure 4 is a sectional detail view, representing a section on the line 4—4 of Figure 3; and Figure 5 is a still further sectional detail view, showing the displacement plunger and cup elements in slightly different operative position, and said plunger arranged for automatic adjustment of its position in response to a remote control means.

Referring now to the drawing in detail, this illustrates one form of the improved apparatus as comprising a storage tank 10 for the liquid, such as a chemical solution, which is required to undergo the feeding and measuring operation, as, e. g., in water purification systems, the upper portion of the tank being provided with a discharge cup 12 communicating with a discharge outlet tube 14 from which the measured liquid is conducted to any desired point, according to the equipment with which the apparatus is to be used. For transferring the liquid from the main supply within the tank 10 to the discharge cup 12, the present form of apparatus provides a dipper arm 15 having one end thereof secured to an oscillating shaft 16 which is mounted in bearing brackets 17 above the tank; the free end of the arm carries a pair of fork elements 18 providing trunnions 19 for pivotally suspending a dipper or liquid transferring cup 20, which is thus adapted to be submerged in the liquid of the tank by the oscillating movement of the arm, as represented by the dotted lines in Figure 2, and thereafter elevated for the purpose of bringing the lateral discharge mouth 21 of the cup into discharge relation to the cup 12, as represented by the full lines in said views.

One method of oscillating said arm comprises a suitable motor 22 shown as mounted on a platform 23 over the tank 10, and provided with a pulley 24 connected by a belt 25 with a pulley 26 of a speed reduction unit 27 having a crank disk 28 connected by an operating link 29 to an arm 30 secured to the shaft 16. Obviously such a drive arrangement is adapted for the operation of a plurality of liquid feeding units, since the shaft may be extended into operative relation to a series of tanks (a portion of an adjoining unit being indicated in Figure 1), each having its own individual liquid feeding mechanism. As the cup 20 rises to its uppermost position, a measured volume of the liquid is displaced from the cup by the action of a displacement plunger 32 which is supported in upright position in alinement with the upper portion of the cup's movement. The plunger 32 is held in position for this purpose by means of an angle plate 33 bolted to the platform 23 as indicated at 34, and provided with a vertical clamping groove 36 for engagement with the plunger, which is held in place by a clamping element 34, bolt 38, and clamp nut 39 (see Figure 4). The adjacent upright face of the plate 33 may be calibrated to show a scale 40 for indicating corresponding displacement values of the plunger according to the various adjusted positions thereof.

In order to prevent undue lateral vibration of the arm 15 as it moves into its uppermost position, a guide pin 42 is carried by a plate 43 secured to the platform 23, said pin depending vertically in position for entering between the fork elements 18, as represented in Figures 1 and 2. The cup 20 is also provided with means for limiting its swinging movement upon the trunnions 19, in order that the cup will be presented in approximate vertical alinement with the plunger, for which purpose an abutment pin 45 is adjustably clamped by set screws 46 to a lug 47 formed on a bracket member 48 carried by the arm 15, in position for abutting engagement with the rear side of the cup, as illustrated in Figure 2.

Under some conditions, as where the liquid being handled comprises a solution which should be kept stirred or agitated, the movement of the arm 15 may be utilized for this purpose, by the attachment of a suitable blade or paddle 49 secured by bolts 50 to the bracket member 48, as represented by both full and dotted lines in Figure 2.

Provision is also made to insure passage of all the liquid displaced by the plunger from the cup 20 into the cup 12, by preventing any of it from dripping down the sides of said cup 20. For accomplishing this result a capillary fork 52, comprising a piece of wire bent in hairpin fashion, is pivotally mounted upon a bracket element 53 which is secured to the plate 33 in position for suspending the fork 52 opposite the mouth 21 of the cup 20, the lower end of the fork being slightly bent and projecting into the discharge cup 12. The arrangement is such that as the cup 20 moves into its uppermost or discharge position, its mouth portion engages the fork 52 and moves it slightly forward, and on lowering of the cup 20 the fork swings back and its lower end is retained within the cup 12 by engagement with the top edge thereof, so that all liquid dripping from the mouth 21 (which might otherwise fall outside the cup 12) will trickle along the fork 52 and be thereby drained into the cup 12.

The operation of the apparatus and its functions will be apparent from the drawing in the light of the foregoing description. An oscillating movement is imparted to the arm 15 by means of the drive mechanism, at whatever rate the same is set to operate, and this results in a combined agitating and liquid dipping action of the parts carried by said arm, as will be clear from the showing in Figure 2.

As the arm 15 and cup 20 approach the upper limit of their movement, the pins 43 and 45 cooperate to insure the proper alinement of the cup with the plunger 32, and the latter positively displaces a given volume of the liquid from the cup, according to the diameter of the plunger and the position of its vertical adjustment as indicated by the scale markings 40. Such liquid is discharged from the mouth 21 into the discharge cup 12, and any drippings are caught by the capillary fork 52 and drained into said cup 12.

Thus a liquid feeding device is provided which accurately measures the liquid fed by a positive displacement method, and of course in its primary sense it is immaterial whether the final displacement is effected by movement of the cup or corresponding movement of the plunger. The construction shown is extremely simple, as well as effective, and unlike pumps or other volume measuring devices, utilizes no frictional moving parts or packing structures having a tendency to wear and become loose, etc., and hence develop error factors in the measuring function. In the present construction, the plunger may be of any material suitable for the purpose, and will continue to function accurately for the displacement or measuring action so long as it is kept clean and free from any accretions; moreover, the displacement function may be varied by simply substituting different plungers of different diameter, thereby correspondingly varying the volume of liquid displaced from the cup 20 at each upward movement thereof. The type of apparatus shown is clearly adapted for liquid feeding and measuring operations ranging from feeding operations of a periodic or intermittent character, at wide intervals, to others where the feeding action is required to be almost continuous and where the demand as regards frequency of the operation is met by simply adjusting the drive mechanism to correspond.

The apparatus is moreover readily adapted for being made automatically responsive to varying demands for the feeding operation, as is necessary in the treatment of boiler feed water, where the speed of the present equipment may readily be made proportional to the speed of the boiler feed pump; or again, the adjustment of the displacement plunger 32 may be automatically effected in response to changing conditions in the particular relation in which the equipment is being used (e. g. variations in the head of water flowing through an orifice or over a weir), which may be done by suspending the plunger from a cord 56 passed over a pulley 57, whereby the plunger may be shifted vertically within a guide 58, the movement of which cord would be rendered responsive, as by movement of a float member 60 operating on a variable water level 61 (Fig. 5) or other regulating means, to the conditions calling for the variation in the operation of the liquid feeding device.

It is therefore apparent that a simple, practical and highly efficient arrangement and construction have been devised for carrying out the various objects of the invention as herein set forth, and while the foregoing represents a form of apparatus which is appropriate for the practice of the invention, I desire to reserve the right to make whatever changes or modifications may fairly fall within the scope of the appended claims.

Having thus described my invention, what I claim to be new and desire to secure by Letters Patent is:

1. Liquid measuring and feeding apparatus comprising a receptacle for containing the liquid and provided with a discharge outlet, a displacement member adjacent to said outlet, means for intermittently elevating a portion of the liquid and subjecting the same to the action of said displacement member for delivering a given measured quantity of the liquid into said outlet, and a movable drip drain element located in overhanging relation to said outlet for intercepting any drippings from said elevating means and directing said drippings into said outlet.

2. Liquid measuring and feeding apparatus comprising a receptacle for containing the liquid and provided with a discharge outlet, a displacement member adjacent to said outlet, a movable vessel operated intermittently to elevate a portion of the liquid and subject the same to the action of said displacement member for delivering a given measured quantity of the liquid into said outlet, and a capillary device for intercepting any drippings from said vessel and directing said drippings into said outlet.

3. Liquid measuring and feeding apparatus comprising a receptacle for containing the liquid and provided with a discharge outlet, a displacement member adjacent to said outlet, a vessel movable toward and from said discharge outlet, means for intermittently submerging said vessel in the liquid and transferring a portion thereof into position for subjecting it to the action of said displacement member and thereby delivering a given measured quantity of the liquid into said outlet, and a blade carried by said first means in position underlying said vessel for stirring the contents of the receptacle.

4. Liquid measuring and feeding apparatus comprising a receptacle containing the liquid and provided with a discharge outlet, an adjustable displacement member adjacent to said outlet and provided with float-controlled means for automatically varying the vertical position thereof, and means for intermittently transferring a quantity of said liquid to the vicinity of said outlet and subjecting the same to the action of said displacement member, whereby a given measured quantity of the liquid is delivered to said outlet.

5. Liquid measuring and feeding apparatus comprising a receptacle containing the liquid and provided with a discharge outlet, a movable displacement member adjacent to said outlet, means for intermittently transferring a quantity of said liquid to the vicinity of said outlet and subjecting the same to the action of said displacement member whereby a given measured quantity of the liquid is delivered to said discharge outlet, and a remote control connection provided with float-actuated means for automatically adjusting the position of said displacement member for varying the displacement function thereof.

ELMER E. HARPER.